Sept. 2, 1930.  F. C. THOMPSON  1,774,618
CHANGE SPEED DEVICE
Filed Sept. 22, 1927  2 Sheets-Sheet 1
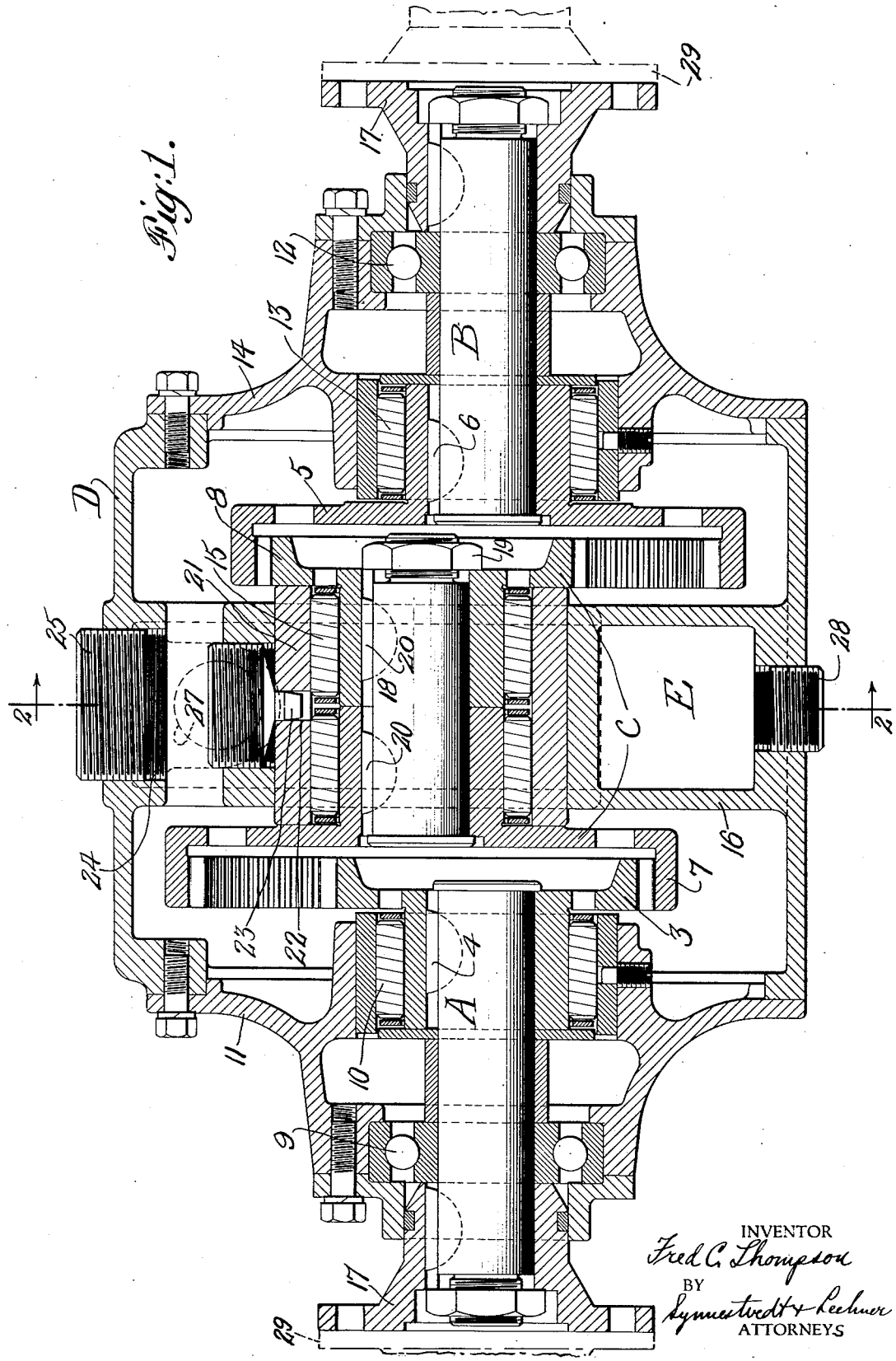

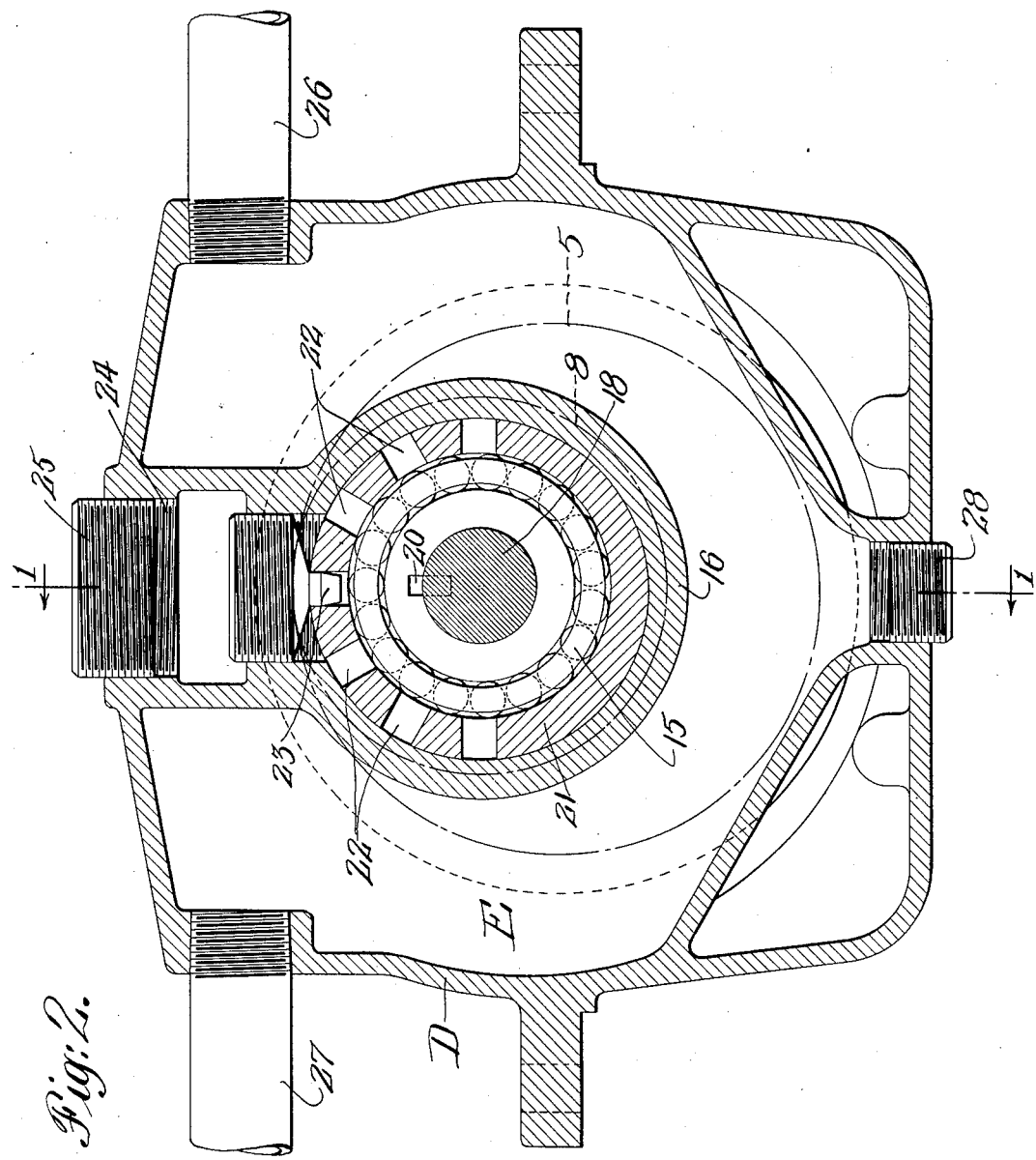

Patented Sept. 2, 1930

1,774,618

UNITED STATES PATENT OFFICE

FRED C. THOMPSON, OF DETROIT, MICHIGAN, ASSIGNOR TO MORSE CHAIN COMPANY, OF ITHACA, NEW YORK, A CORPORATION OF NEW YORK

CHANGE-SPEED DEVICE

Application filed September 22, 1927. Serial No. 221,206.

This invention relates to change speed devices and has for one of its primary objects the provision of a simple, compact and quiet running change speed device which is inexpensive to manufacture.

Another object is the provision of a change speed device adapted to be associated with a driving means and means to be driven for either increased speed or reduced speed by merely reversing the device end for end.

A further object is the provision of a change speed device in which manufacturing costs are kept down by employing duplicate parts in constructing various parts of the device.

Still another object of the invention is to provide a change speed device having means for minimizing noise.

A still further object is to provide a change speed device employing internal and external gears in which ineffective mesh of the gears may be readily compensated for in a simple manner.

How the foregoing, together with such other objects and advantages as may hereinafter appear, or are incident to my invention, are realized, is illustrated in preferred form in the accompanying drawings, wherein—

Fig. 1 is a longitudinal section through a device embodying my invention, the section being taken on the line 1—1 of Fig. 2, and Fig. 2 is a cross section taken on the line 2—2 of Fig. 1.

Assuming that the device is to be used for speed reduction, the device comprises in general, a driving shaft A having a driving gear 3 secured thereon, as by means of the key 4, a driven shaft B having a driven gear 5 secured thereon as by means of the key 6, a compound gear C composed of gears 7 and 8 meshing with the gears 3 and 5, respectively, and a casing or housing D for the gears.

The gearing is of the internal-external type, and, in this instance, the external driving gear 3 meshes with the internal gear 7 of the compound gear C and the external gear 8 of the compound gear meshes with the driven gear 5. Thus, it will be seen that the speed of the driven shaft B is reduced with respect to the speed of the shaft A. Suitable bearings 9 and 10 for the shaft A are provided in the end closure or cover plate 11 of the housing D, and suitable bearings 12 and 13 for the shaft B are provided in the end closure or cover plate 14 of the housing. The compound gear C is provided with a bearing 15, the axis of which is offset to the axes of the aligned shafts A and B, which bearing is supported by the portion 16 of the housing D.

It is to be observed that the shafts A and B with their coupling or torque transmitting members 17, 17, and their bearings 9, 12, 10 and 13 are of identical construction, as are the end closures 10 and 14 of the housing, whereby I am enabled to very materially keep the cost of manufacture down, particularly when the cost in tooling up for the manufacture of the parts is considered. In this connection, it is also to be noted that the driving gear 3 is identical in construction to the construction of the gear 8 of the compound gear C, and that the driven gear 5 is identical in construction to the construction of the gear 7 of the compound gear. Not only is the construction of these gears identical but also the construction is such that I am enabled to conveniently form a compound gear of gears which are duplicates of the driving and driven gears. The bearing 15 in this instance is formed of two anti-friction bearings which are duplicates of the bearings 10 and 13 hereinbefore mentioned. The gears 7 and 8 of the compound gear C are rigidly secured together by means of the stud 18 and nut 19 which serves to clamp the gears together. Keys 20, 20 prevent relative rotation of the gears 7 and 8.

In order to ensure proper and effective mesh of the internal and external gears, I have provided an adjustable eccentric bushing 21 which may be rotated to change the relation of the axis of the compound gear to the axes of the drive and driven shafts. The bushing 21 in this instance constitutes the outer race of the bearing 15 and is provided with a plurality of holes or notches 22 which may be engaged by a suitable tool in order to make an adjustment. By this means I am enabled to bring the meshing gears into effective mesh in a very simple manner. This not only is useful to compensate for inaccuracies in machining, but also enables me to effect proper mesh after the gears wear in service. A locking device, such as the dowel 23 which engages the holes 22, is provided for locking the bushing 21 in its adjusted position. I have preferably made this dowel in the form of a screw threaded plug having a dowel end, which is conveniently accessible from the outside of the casing through the opening 24 in the housing, which opening is provided with a suitable cap or plug 25. Access to the bushing 21 for adjusting it may also be had through this opening. Furthermore, it is pointed out that lubricant such as grease may be introduced into the housing through the opening 24.

Reverting now to the particular type of gearing employed in my device, namely, internal-external gearing, it is to be observed that by employing such gearing I have produced a gear device which is very quiet in operation in comparison, for example, to gear devices employing external spur gears. This is attributed in the main to the fact that in such gearing large tooth contact as between the meshing gears is afforded.

In order to further ensure quietness in operation, I have provided means for maintaining a substantially uniform temperature of the lubricant in the housing, as will now appear. A cooling chamber E is provided within the housing, which chamber, in this instance, is formed integral with the housing. The chamber is provided with an inlet 26 and an outlet 27 for a cooling medium such as water. The water may be circulated through the chamber in any suitable manner, as, for example, by means of a water pump. This chamber exposes considerable cooling surface to the grease within the gear housing, and thus the grease is maintained at a substantially uniform temperature, which makes for quietness in operation. It will be seen that in the embodiment shown the cooling chamber also serves to cool the bearing 15. A plug 28 may be provided for draining the water out of the chamber when desired.

In the event that it is desired to employ the device of my invention as an overspeed device, this may be done readily by merely reversing the device end for end, in which case the shaft A above referred to as the drive shaft becomes the driven shaft and the shaft B above referred to as the driven shaft becomes the drive shaft. This is made possible by the symmetrical design of my device and by the employment of like coupling members 17 on each of the shafts. In this connection, it is pointed out that by having the shafts A and B aligned, the coupling members 17, 17 will register with the cooperating coupling members 29, 29 of the associated driving and driven mechanisms with the gear device in either end to end position.

From the foregoing it will be seen that I have provided a simple and compact change speed device which, among other uses, is particularly adapted for use in motor boats. When put to such use I contemplate supplying the water to the cooling chamber by means of a suitable water scoop on the bottom of the boat.

I claim:—

1. A change speed device comprising, in combination, a driving shaft, a driven shaft, a driving gear on the driving shaft, a driven gear on the driven shaft, one of said gears being internal and the other external, a compound gear for connecting said shafts for geared drive including an external gear meshing with said internal gear and an internal gear meshing with the first mentioned external gear, a gear housing, and end closures for said housing through which said shafts project, said end closures having bearings for said shafts, the aforesaid external gears, internal gears, and end closures respectively being interchangeable.

2. A change speed device comprising, in combination, a driving shaft, a driven shaft, a driving gear on the drive shaft, a driven gear on the driven shaft, one of said gears being internal and the other external, a compound gear for connecting said shafts for geared drive including an external gear meshing with said internal gear and an internal gear meshing with the first mentioned external gear, means adjustable to compensate for ineffective mesh between the driving and driven gears and the gears of the compound gear, dowel means for locking said adjustable means in its adjusted position, a housing for said gearing having an opening in alignment with said dowel means, and a closure for said opening.

In testimony whereof I have hereunto signed my name.

FRED C. THOMPSON.